US006812930B1

(12) United States Patent
Dowdy

(10) Patent No.: US 6,812,930 B1
(45) Date of Patent: Nov. 2, 2004

(54) TRANSPARENT COMPATIBILITY AND ADAPTATION TO DIFFERING FORMAT IMPLEMENTATIONS IN A COMPUTER SYSTEM

(75) Inventor: Thomas E. Dowdy, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 1699 days.

(21) Appl. No.: 08/906,648

(22) Filed: Aug. 7, 1997

Related U.S. Application Data

(63) Continuation of application No. 08/644,535, filed on May 10, 1996, now abandoned.

(51) Int. Cl.[7] .................................................. G06F 3/00

(52) U.S. Cl. ....................................... 345/545; 345/502

(58) Field of Search ................................ 345/501, 508, 345/521, 132, 201, 131, 516, 545, 522, 520, 502

(56) References Cited

U.S. PATENT DOCUMENTS

| | | | | | |
|---|---|---|---|---|---|
| 4,439,762 | A | * | 3/1984 | Van Vliet et al. | 345/132 |
| 5,241,656 | A | * | 8/1993 | Loucks et al. | 345/132 |
| 5,388,220 | A | * | 2/1995 | Okabayashi | 345/521 |
| 5,479,606 | A | * | 12/1995 | Gray | 345/508 |
| 5,515,494 | A | * | 5/1996 | Lentz | 395/157 |
| 5,574,836 | A | * | 11/1996 | Broemmelsiek | 395/127 |
| 5,625,386 | A | * | 4/1997 | Howard et al. | 345/201 |

* cited by examiner

*Primary Examiner*—Cao (Kevin) Nguyen
(74) *Attorney, Agent, or Firm*—Sawyer Law Group LLP

(57) ABSTRACT

A method aspect provides a first format, the first format compatible with a format for an application program, provides a second format, the second format compatible with a format for an output device, and transforms inputs from the application program from the first format to the second format for output on the output device to provide compatibility between the application program and the output device without altering the application program. A system aspect for improving compatibility between an application program and a display device of a computer system includes a CPU, at least one real frame buffer-coupled to the CPU and to the display device, the at least one real frame buffer having a first format compatible with the display device, and at least one alternate frame buffer coupled to the at least one real frame buffer and the CPU, the at least one alternate frame buffer having a second format compatible with the application program, wherein the CPU controls transformations from the second format to the first format transparently to the application program.

5 Claims, 3 Drawing Sheets

TRANSPARENT COMPATIBILITY AND ADAPTATION TO DIFFERING FORMAT IMPLEMENTATIONS IN A COMPUTER SYSTEM

This application is a continuation of application Ser. No. 08/644,535, filed May 10, 1996, now abandoned.

FIELD OF THE INVENTION

The present invention relates to device formats in a computer system, and more particularly to maintaining compatible device formats in device lists for computer systems with expanded device formats.

BACKGROUND OF THE INVENTION

In typical computer systems, application programs submit data in a predefined format for producing desired outputs on display devices. The data is normally stored in a frame buffer in the computer system. As shown in FIG. 1*a*, a typical system arrangement includes an application program 10 which interacts with and submits data to a computer system 12. The computer system 12 includes a central processing unit (CPU) 14 coupled to a frame buffer 16. The frame buffer 16 is further coupled to a digital-to-analog converter (DAC) 18. The DAC 18 receives digital data from the frame buffer 16 and converts it by well-known techniques to analog data for output on a display device 20. Of course, computer system 12 includes other components to perform other operations, the details of which are well known to those skilled in the art.

With the system arrangement as shown in FIG. 1*a*, the display device 20 may be one of a number of display device types, such as color, black and white, etc. the application program 10 is configured to support a format of at least one display device type. A device list, which describes the format of a frame buffer, such as the frame buffer 16, normally exists within computer system 12 and provides the display device type for the application program 10.

FIG. 1*b* is a representation of a device list 11. The device list 11 includes a plurality of data structures 13*a*–13*c*, each of the data structures 13*a*–13*c* representing a particular device, such as a monitor. Each of the data structures 13*a*–13*c* include a plurality of data fields 15*a*–*c*, respectively, that indicate information about the device associated with that data structure 13*a*–13*c*. Also within each data structure 13*a*–13*c* there is typically a next device field 17 which points to the next data structure, as indicated by the arrows in FIG. 1*b*, thereby allowing for the linking of the data structures 13*a*–13*c* to provide the device list 11.

While the system arrangement as shown in FIG. 1*a* is adequate for some computer systems, most application programs have difficulty supporting new formats developed to improve performance, since such improvements are typically done well after the application program has been developed. Additionally, attempting to change the application program to support such improvements is time-consuming and costly. Without the ability to communicate with a frame buffer operating in accordance with a new format, the application program is generally rendered ineffective, since it cannot provide data in that new display format.

Accordingly, a need exists for a flexible system arrangement that allows substantially transparent compatibility of an application program with differing formats for display devices. The present invention addresses such a need.

SUMMARY OF THE INVENTION

The present invention provides method, system, and apparatus aspects for providing transparent compatibility and adaptation to differing format implementations in a computer system. Included in a method aspect are providing a first format, the first format compatible with a format for an application program, and providing a second format, the second format compatible with a format for an output device. The method further includes transforming inputs by the application program from the first format to the second format for output on the output device to provide compatibility between the application program and the output device without substantially altering the application program.

In addition, providing a first format includes providing a first frame buffer of the first format, and providing a second format includes providing a second frame buffer of the second format. The first and second formats include first and second resolutions, depths, and video standards.

A system for improving compatibility between an application program and a display device of a computer system includes a CPU, and at least one real frame buffer coupled to the CPU and to the display device. The at least one real frame buffer is defined as having a format compatible with the display device. The system further includes at least one alternate frame buffer coupled to the at least one real frame buffer and the CPU, the at least one alternate frame buffer having a second format compatible with the application program, wherein the CPU controls transformations from the second format to the first format transparently to the application program. The at least one alternate frame buffer is defined as having a format that is not compatible with a display device.

In an apparatus aspect, an apparatus for improving compatibility between an application program and a display device of a computer system includes a first frame buffer means of a first format, the first frame buffer means compatible with and storing data from the application program, a second frame buffer means of a second format, the second frame buffer means compatible with the display device, and a transformation means between the first frame buffer means and the second frame buffer means for transforming data in the first format to data in the second format transparently to the application program. The apparatus further includes a CPU, the CPU coupled to and controlling the first and second buffer means and the transformation means. Additionally, the apparatus includes RAM, the RAM coupled to the CPU and the first buffer means for receiving untransformed data from the first buffer means.

With these aspects of the present invention, new formats are readily included in a computer system while maintaining compatibility with applications implementing old formats. The provision of frame buffers for the old formats ensures reception of data from the application programs, while the utilization of frame buffers with the new formats allows improved performance and reduced costs to be achieved. Additionally, the inclusion of frame buffers supporting new formats allows applications that also support the new formats to capably utilize them. These and other advantages of the aspects of the present invention will be more fully understood in conjunction with the following detailed description and accompanying drawings.

DETAILED DESCRIPTION

The present invention relates to transparently maintaining compatibility for application programs with computer systems having improved display formats. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1A:
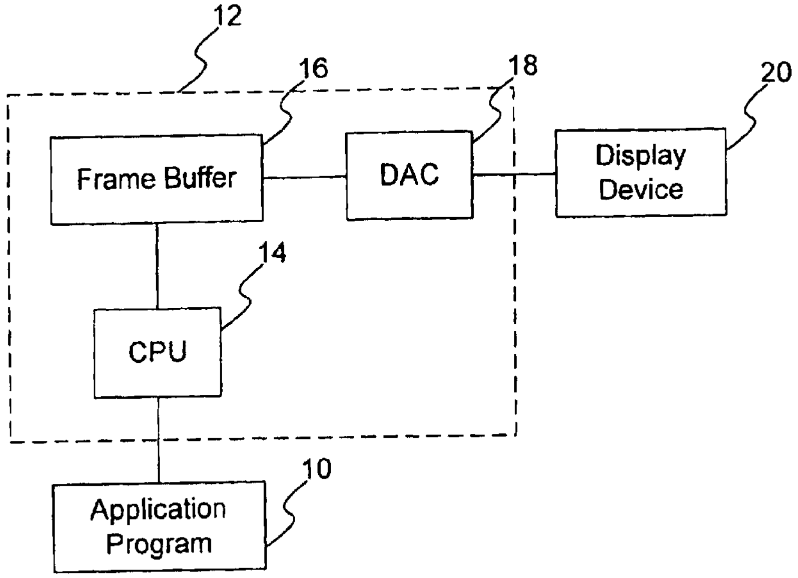
FIG. 1a (Prior Art)
FIG. 1*a* illustrates a partial block diagram of a typical computer system.
Figure 1B:
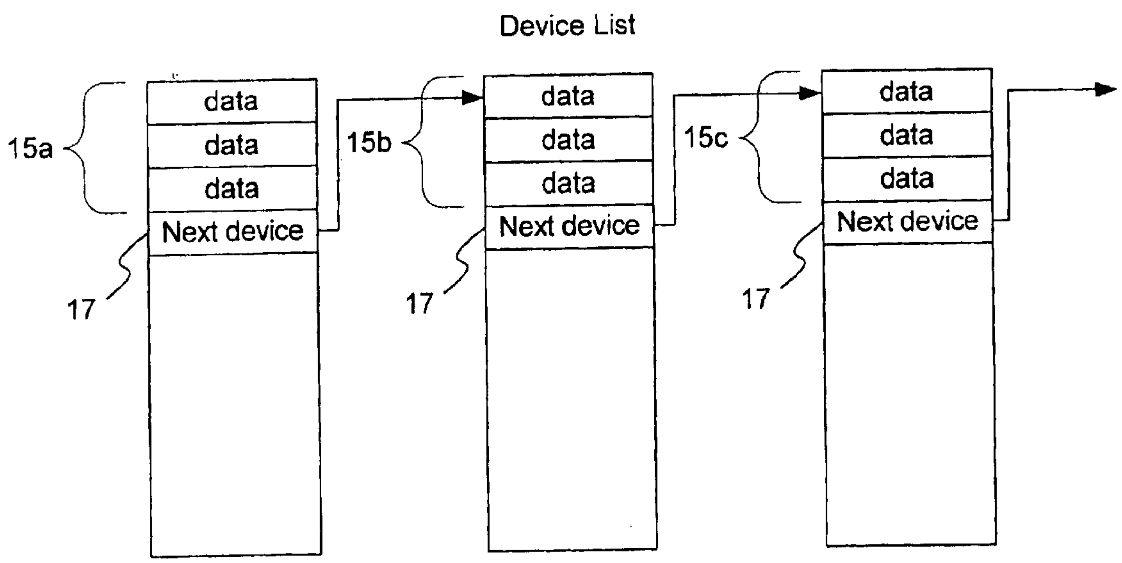
FIG. 1b (Prior Art)
FIG. 1*b* illustrates a block diagram of a device list in a typical computer system.
Figure 2:
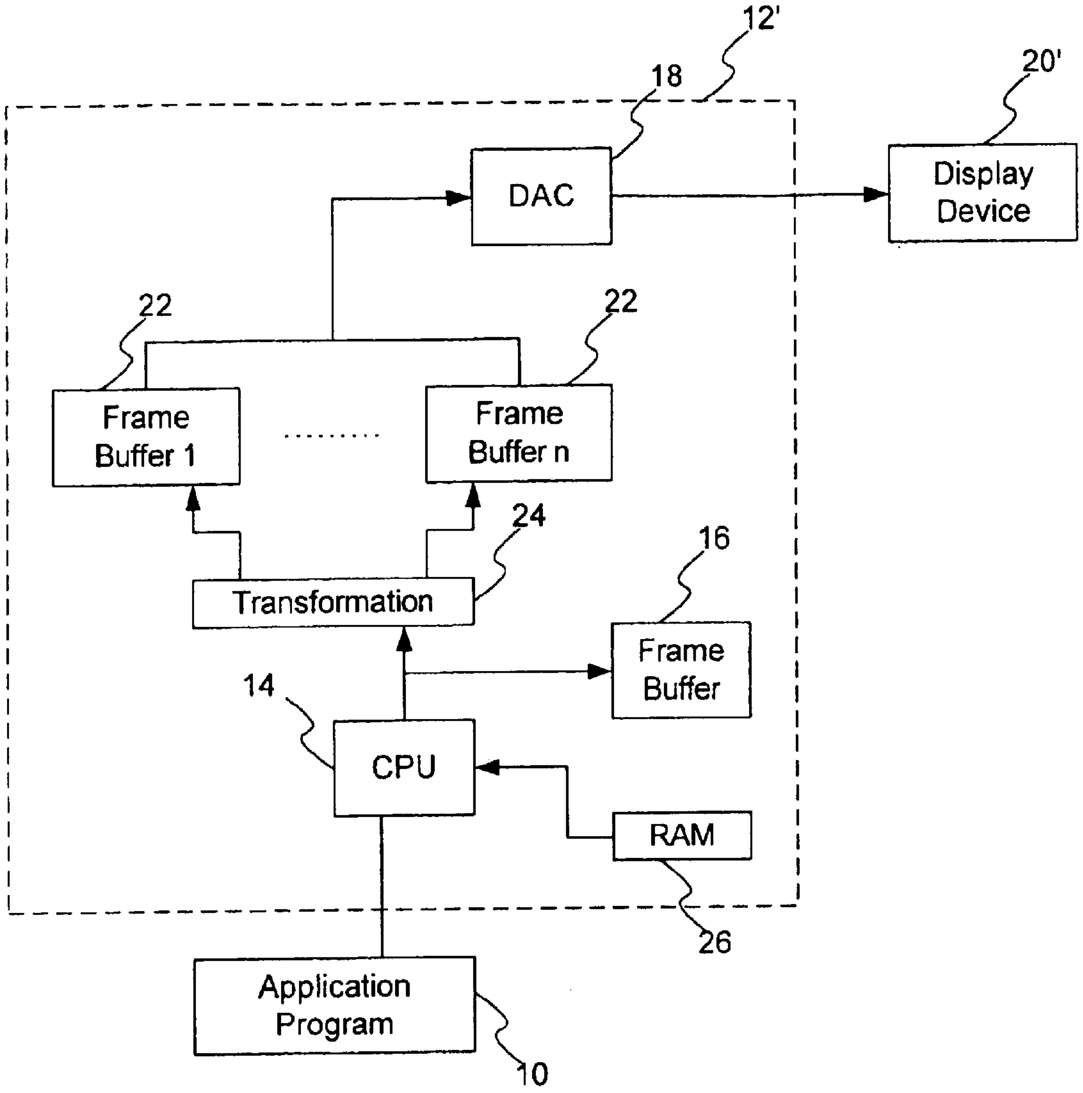
FIG. 2 illustrates a partial block diagram of a computer system in accordance with the present invention.

FIG. 2 presents a system arrangement in accordance with the present invention with like components from FIG. 1 numbered similarly. The system arrangement of FIG. 2 includes an application program 10 running on a computer system 12', such as an Apple Macintosh computer. Computer system 12' includes a CPU 14 and frame buffer 16. The frame buffer 16 preferably supports a known device format that provides compatibility for the device formats supported by the application program 10. Computer system 12' further includes additional frame buffers 22 which represent a chosen number, e.g. 1 to n, of frame buffers supporting differing device formats for display data output on at least one display device 20'. As used herein, device formats preferably refer to a resolution specification (number of dots per inch (dpi)) for a display device 20', a video standard, including but not limited to RGB, YUV, etc., for a display device 20', and/or a depth, e.g. a number of bits per pixel, of data that the frame buffer stores for a given display device 20'.

Further included in computer system 12' is transformation mechanism 24. Transformation mechanism 24 is suitably provided as a software mechanism, hardware mechanism, or a combination of both, to appropriately transform data submitted by application program 10 to computer system 12' from a format compatible with the frame buffer 16 to a format compatible with at least one of the frame buffers 22.

Figure 3:
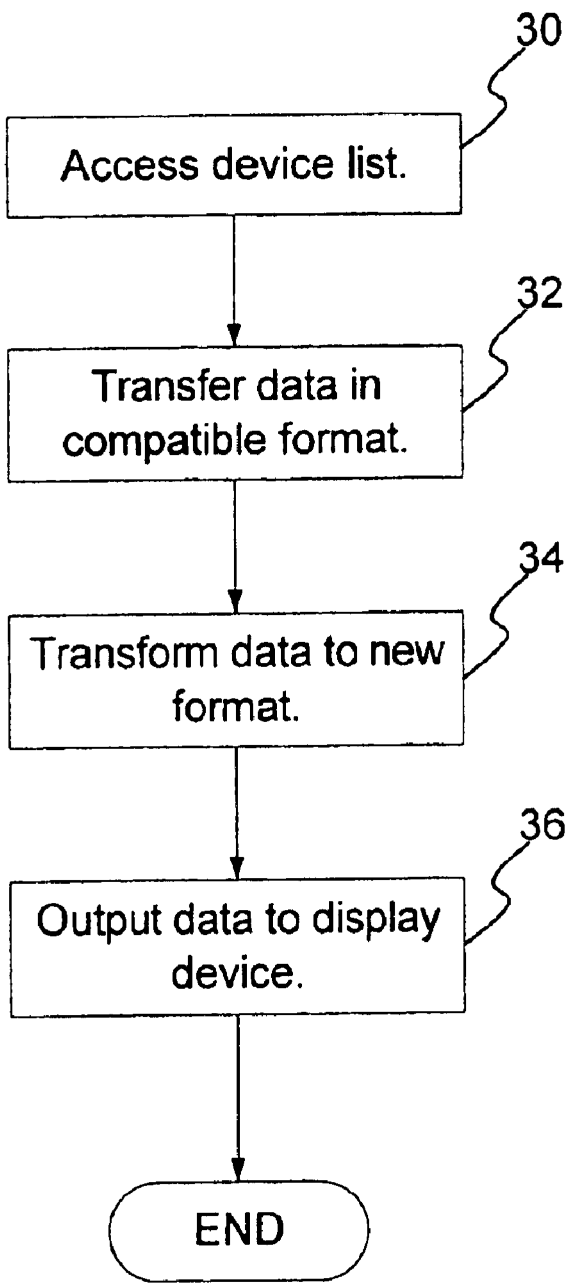
FIG. 3 illustrates a flow diagram of the operation of the system of FIG. 2.

FIG. 3 presents a preferred embodiment of operation for the components of FIG. 2 including transformation mechanism 24 in accordance with the present invention. The application program 10 suitably accesses a device list from computer system 12' to determine if a compatible display device exists (step 30). By including the frame buffer 16 in the computer system 12', the application program 10 is ensured of recognizing a suitable device in the device list and accessing a compatible frame buffer in the computer system 12' to enable successful data transfer (step 32). Preferably, the data input to frame buffer 16 is not provided to a display device 20', but is transferred to RAM 26 and is transformed via transformation mechanism 24.

In accordance with the present invention, the transformation mechanism 24 also receives the data submitted to frame buffer 16 and transforms it with the necessary format adjustments to one of the frame buffers 22 (step 34). By way of example, one of the frame buffers 22 may provide a new format that supports an increase in the resolution, e.g. from 72 dpi to 144 dpi, for better output on a display device 20. Transformation mechanism 24 suitably doubles the resolution by techniques that are well-known by those skilled in the art. Such a mechanism is described in "Digital Image Warping" by George Wolberg (Wolberg reference) which is published by IEEE Computer Society Press (1990). Alternatively, a frame buffer 22 may support a new format that reduces the number of bits stored per pixel, e.g, from 32 bits per pixel to 24 bits per pixel, with the transformation mechanism 24 eliminating a byte of data to reduce hardware storage requirements, as is well understood by those skilled in the art. Such a mechanism is described in "Computer Graphics Principles and Practices", 2nd edition, by Foley, Van Dam, Feiner and Hughes (Van Dam reference) which is published by Addison-Wesley (1990).

In another new format to increase display options, a frame buffer 22 may a change to a different video standard, such as from RGB (red-green-blue) standard to YUV standard. Transformation mechanism 24 then suitably performs such changes, as is again well understood by those skilled in the art and as described in the Van Dam reference. Once transformation of the data is completed, the appropriate frame buffer 22 transfers the data from the application program 10 in the proper format for a display device 20' through DAC 14 (step 36).

With the present invention, new formats can be developed to reduce costs and improve performance with transparent compatibility for programs developed to correspond with old formats. The ability to provide both the 'real' frame buffers, i.e., frame buffers 22, that follow the new formats and the 'alternate' frame buffer, i.e., frame buffer 16, that follows the old format in device lists of a computer system readily achieves better system operation without requiring the considerable time and expense of making changes to the application programs. Thus, improved flexibility for supporting a variety of formats developed for differing memory depths, differing resolutions, and differing color formats is realized.

It should be appreciated that although the foregoing has been described for a display device environment, the principles of the present invention are readily applicable for other computer system component arrangements. For example, video cards supporting multiple apertures typically treat each aperture as a different mode. The card normally has to be put in the appropriate mode before making use of the aperture. With the use of 'real' and 'alternate' apertures in accordance with the present invention, the transformation mechanism renders switching between modes unnecessary and allows appropriate selection of a desired aperture to occur seamlessly.

Although the present invention has been described in accordance with the embodiments shown, one of ordinary skill in the art will recognize that there could be variations to the embodiment and those variations would be within the spirit and scope of the present invention. For example, depths may include 1 bit, 8 bits, 24 bits, 32 bits, etc. per pixel. Further, although specific examples are provided as to the type of new formats possible, these are merely exemplary and not restrictive of the present invention. Thus, the development of additional improvements is readily implemented in accordance with the present invention. Accordingly, many modifications may be made by one of ordinary skill without departing from the spirit and scope of the present invention, the scope of which is defined by the following claims.

What is claimed is:

1. A system for improving compatibility between an application program and a display device of a computer system, the system comprising:

a CPU;

at least one real frame buffer coupled to the CPU and to the display device, the at least one real frame buffer having a first format compatible with the display device; and at least one alternate frame buffer coupled to the at least one real frame buffer and the CPU, the at least one alternate frame buffer having a second format compatible with the application program and being provided in a device list for access by the application program, wherein the CPU controls transformations from the second format to the first format transparently to the application program to allow output to the display device from the at least one real frame buffer.

2. The system of claim 1 wherein the first and second formats comprise first and second resolutions, first and second depths, and first and second video standards.

3. An apparatus for improving compatibility between an application program and a display device of a computer system, the apparatus comprising:

a first frame buffer means of a first format, the first frame buffer means compatible with and storing data from the application program;

a second frame buffer means of a second format, the second frame buffer means compatible with and coupled to the display device; and a transformation means between the first frame buffer means and the second frame buffer means for transforming data in the first format to data in the second format transparently to the application program to allow output to the display device from the second frame buffer means.

4. The apparatus of claim 3 further comprising a CPU, the CPU coupled to and controlling the first and second buffer means and the transformation means.

5. The apparatus of claim 4 further comprising RAM, the RAM coupled to the CPU and the first buffer means for receiving untransformed data from the first buffer means and avoiding output of the untransformed data on the display device.

* * * * *